(12) United States Patent
Szegedi et al.

(10) Patent No.: US 7,184,363 B2
(45) Date of Patent: Feb. 27, 2007

(54) BUOYANT CONTAINER WITH WAVE GENERATED POWER PRODUCTION

(75) Inventors: Nicholas J. Szegedi, Simi Valley, CA (US); Steven E. Havelka, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 132 days.

(21) Appl. No.: 11/033,082

(22) Filed: Jan. 10, 2005

(65) Prior Publication Data

US 2005/0169104 A1 Aug. 4, 2005

Related U.S. Application Data

(60) Provisional application No. 60/541,095, filed on Feb. 2, 2004.

(51) Int. Cl.
*H04B 1/59* (2006.01)
*H02K 35/00* (2006.01)
(52) U.S. Cl. ......................................................... 367/3
(58) Field of Classification Search .................... 367/3, 367/4; 310/17
See application file for complete search history.

(56) References Cited

U.S. PATENT DOCUMENTS

| 5,020,032 | A | 5/1991 | Dale et al. | 367/4 |
| 5,347,186 | A | 9/1994 | Konotchick | 310/17 |
| 6,791,205 | B2* | 9/2004 | Woodbridge | 310/17 |
| 2003/0121255 | A1 | 7/2003 | Dick | 60/398 |
| 2005/0169104 | A1* | 8/2005 | Szegedi et al. | 367/3 |

FOREIGN PATENT DOCUMENTS

| FR | 1602911 | 4/1971 |
| FR | 2543619 | 10/1984 |
| GB | 940823 | 11/1963 |

OTHER PUBLICATIONS

International Search Report and Written Opinion from corresponding international application PCT/US2005/002622, Mailed Jan. 19, 2006.

* cited by examiner

*Primary Examiner*—Dan Pihulic

(57) ABSTRACT

An apparatus designed to float on or in a liquid has at least two buoyant members. The apparatus utilizes relative motion between the buoyant members to generate power, and the buoyant members are coupled to the apparatus in such a manner that surface movement of a fluid that the apparatus is floating in causes relative motion between the buoyant members. The apparatus may be a housing that includes an electrical apparatus within it, with the electrical apparatus being powered directly or indirectly by power generated by the floating apparatus. The apparatus may be a sonobuoy, and may include a sensor array hanging from a floating housing that includes the at least two buoyant members.

17 Claims, 3 Drawing Sheets

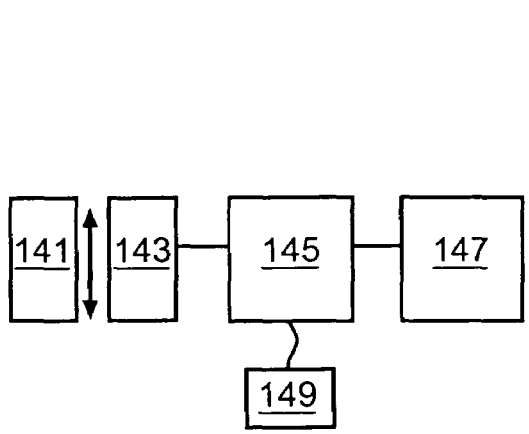
FIG. 11
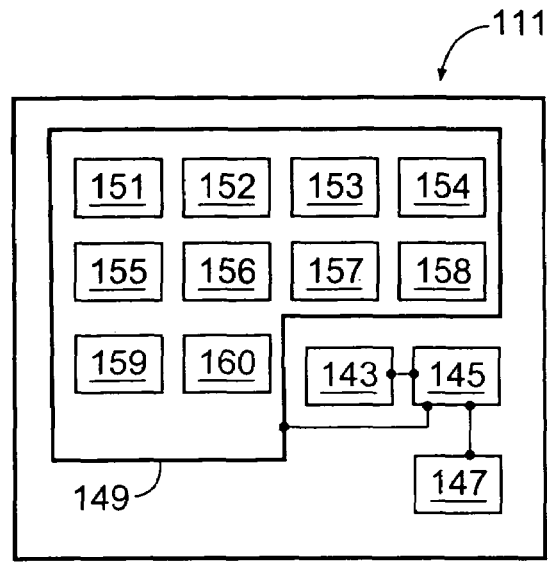
FIG. 12
| Sonobuoy Ocean Generator Calculations | | | | |
|---|---|---|---|---|
| Total Electronics Unit volume = 2484 cubic inches | | | | |
| Calculate submersion required to lift electronics unit (and sensor cable) to upper colar stop: | | | | |
| Submerged Distance inches | Submerged Volume cu in | Submerged Volume cu ft | Displaced Water lb | Net Upward Bouancy Force lb |
| 1 | 154 | 0.1 | 6 | -24 |
| 2 | 308 | 0.2 | 11 | -19 |
| 3 | 462 | 0.3 | 17 | -13 |
| 4 | 615 | 0.4 | 22 | -8 |
| 5 | 769 | 0.4 | 28 | -2 |
| 6 | 923 | 0.5 | 33 | 3 |
| 7 | 1077 | 0.6 | 39 | 9 |
| Collar volume cu ft | Collar lift lb | less 20 lb collar | | |
| 1.50 | 93.7 | 74 | | |
| 2.72 | 170.1 | | | |
| 1.22 | 76.3 | | | |
| | 93.7 | 74 | | |
FIG. 13

BUOYANT CONTAINER WITH WAVE GENERATED POWER PRODUCTION

CROSS-REFERENCES TO RELATED APPLICATIONS

This application claims the benefit of Provisional Application No. 60/541,095, filed Feb. 2, 2004, herein incorporated by reference in its entirety.

FIELD OF THE INVENTION

The present invention relates generally to buoyant containers and sonobuoys.

BACKGROUND OF THE INVENTION

A sonobuoy is a buoy equipped with an acoustic receiver and a radio transmitter that emits radio signals when it detects underwater sounds. Sonobuoys have been deployed into the ocean to aid in the detection of submarines and other vessels. Some sonobuoys are equipped with devices that emit signals and receive the resulting echo. Others are capable of detecting noise generated by crafts, such as submarines. By deploying a number of sonobuoys, the location of such crafts can be determined.

Deployment of sonobuoys is generally accomplished by launching the buoys from aircraft. Sonobuoys are often deployed in remote locations and far enough away from each other such that it is inconvenient, difficult, or impossible to provide power to them on an ongoing basis and/or in a stored form. As such, the lifetime of a buoy is typically at least partially dependent on how much electrical energy it has stored on board. On-board sources of electrical energy may comprise, for example, a seawater activated battery or other electro-chemical energy source. Unfortunately, the amount of electrical energy that is stored on-board is often insufficient to power a buoy for what would otherwise be its useful life. Shortened lifespan due to an inadequate supply of onboard power applies to other apparatus as well such as floating navigational beacons.

A possible solution to the problem of inadequate on-board electrical energy storage is to have the apparatus generate electrical energy from wave motion. Many approaches have been developed in the past to harness this natural energy source. One approach is to utilize the energy potential derived from a swinging or rotating pendulum, but unless kept very small relative to the sonobuoy, such a device would have the tendency to tip the sonobuoy on its side rendering it useless. The power generating capability of such a system is also often inadequate during heavy wave action. Another approach is the use of piezoelectric polymer systems that generate electricity as the wave action on the buoy stretches a polymer anchor hose, but such an approach is often unsatisfactory for a variety of reasons. Moreover, large turbines, pipes, and complex mechanical structures are not practical for a small buoy generator either.

SUMMARY OF THE INVENTION

The present invention is directed to methods and apparatus relating to the use of relative motion between buoyant members floating in a liquid to generate power.

An embodiment of the invention is a buoyant apparatus adapted to float in a fluid, the apparatus having at least two buoyant members. The buoyant members are moveable relative to each other; and the buoyant members comprise energy conversion apparatus that converts relative motion between the buoyant members into electricity. For example, the first buoyant member contains a first part of an electromagnetic generator while the second buoyant member contains a second part of an electromagnetic generator.

Another embodiment of the invention is a sonobuoy having a housing assembly. The housing assembly includes a center housing and a free moving urethane foam flotation collar that moves up and down outside the center housing with wave and swell motion. Inside the housing assembly are a power supply circuit and a battery. A sensor array is coupled to the housing assembly. The inside vertical wall of the center housing is fabricated from a polymer material with a coil of wire wound around its circumference. The flotation collar is fabricated with internal permanent magnets. Movement of the flotation collar up and down outside the center housing generates a low frequency AC current in the coil, and the power supply circuit converts the generated low frequency AC power into DC power to charge the battery.

BRIEF DESCRIPTION OF THE DRAWINGS

The exact nature of this invention, as well as the objects and advantages thereof, will become readily apparent from consideration of the following specification in conjunction with the accompanying drawings in which like reference numerals designate like parts throughout the figures thereof and wherein:

FIG. 11 is a schematic view of the sonobuoy of FIG. 9.

FIG. 12 is an architectural view of the electronics of the sonobuoy of FIG. 9.

FIG. 13 is a table providing buoyancy vs. submerged depth calculations.

DETAILED DESCRIPTION OF THE PREFERRED EMBODIMENTS

Reference will now be made to the preferred embodiments of the invention, examples of which are illustrated in the accompanying drawings. While the invention will be described in conjunction with the preferred embodiments, it will be understood that these embodiments are not intended to limit the invention. On the contrary, the invention is intended to cover alternatives, modifications and equivalents, which may be included within the spirit and scope of the invention as defined by the appended claims. In the following detailed description, numerous specific details are set forth in order to provide a thorough understanding of the present invention. However, it will be understood by one of ordinary skill in the art that the present invention may be practiced without these specific details. In other instances, well known methods, procedures, components, and circuits have not been described in detail so as not to unnecessarily obscure the important aspects of the present invention.

Figure 1:
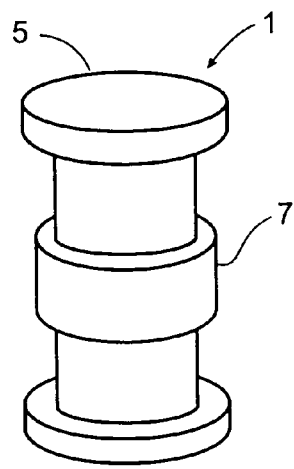
FIG. 1 is a perspective view of a first buoyant apparatus in accordance with an exemplary embodiment of the invention.
Figure 2:
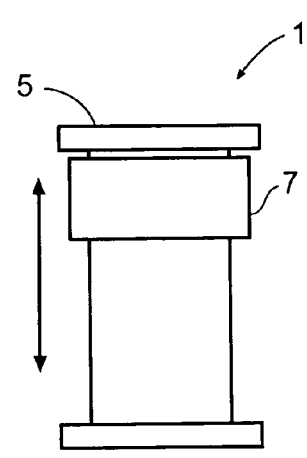
FIG. 2 is a side view of the apparatus of FIG. 1 having a collar positioned near the top of the apparatus.
Figure 3:
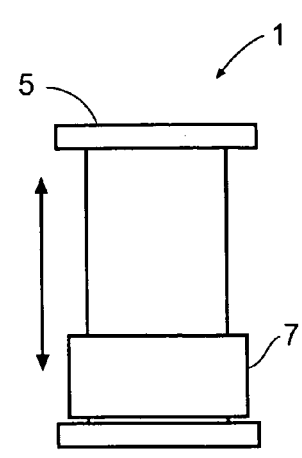
FIG. 3 is a side view of the apparatus of FIG. 1 having a collar positioned near the bottom of the apparatus.

In FIG. 1, a buoyant apparatus 1 utilizes movement of a liquid in which the apparatus floats to generate electricity. The apparatus 1 comprises a center housing 5 and a flotation collar 7. The floatation collar 7 moves up and down outside the center housing 5 as in response to liquid motion as illustrated in FIGS. 2 and 3. In FIG. 2, the flotation collar is positioned near the top of the center housing 5, while in FIG. 3 it is positioned near the bottom of the center housing 5.

By positioning one or more conductive coils and one or more permanent magnets in the center housing 5 and the flotation collar 7, relative movement between the center housing 5 and the flotation collar 7 will cause current to flow in the conductive coil. The conductive coil is a first part of an electromagnetic generator and the magnet is a second part of the electromagnetic generator. As such, the apparatus 1 can be used to provide electricity to an electrical unit positioned within the apparatus 1, or electrically coupled to the apparatus 1.

The positions of conductive coils and permanent magnets may vary between embodiments. As such, using the apparatus of FIG. 1 as an example, a coil may be included in the flotation collar 7 with a permanent magnet in the center housing 5, or a permanent magnet may be included in the flotation collar 7 with a conductive coil in the center housing 5, or a permanent magnet and a conductive coil may be both be found in each of the center housing 5 and the flotation collar 7. In some instances it may be advantageous to position a coil in whatever portion of the apparatus will house or be electrically connected to a load that will utilize current flowing through the coil.

Figure 4:
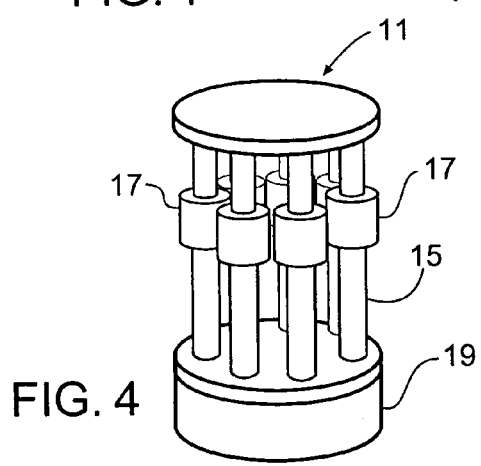
FIG. 4 is a perspective view of a second buoyant apparatus in accordance with an exemplary embodiment of the invention.

The number of buoyant members that move relative to each other may also vary between embodiments. FIG. 4 illustrates a buoyant apparatus 11 comprising a plurality of flotation collars 17 that slide along shafts 15. In such an embodiment, it might be advantageous to position magnets in the collars 17 and coils in the shafts 15 to facilitate electrically coupling the coils to electrical apparatus positioned in the base 19.

The mechanism by which members move relative to each other may also vary between embodiments. As an example, the apparatus of FIG. 5 has a collar 27 having a central cavity 28 within which the center housing 25 slides. The cavity 28 includes end openings 29 that permit fluid flow into and out of the cavity 28. Although shown with two substantially equally sized openings, alternative embodiments may include a different number of openings, openings positioned differently, and/or openings of different sizes so long as fluid in which the apparatus 21 is floating can flow into and out of the cavity 28. If the apparatus 21 is sufficiently buoyant that it will float on a surface of the fluid, some openings into the cavity 28 may be designed to permit adequate air flow into and out of the top of the cavity.

Figure 5:
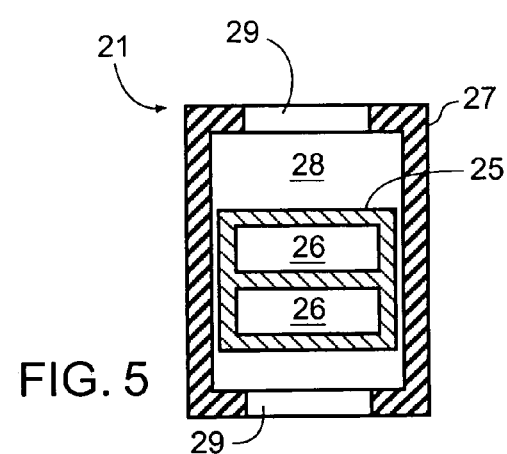
FIG. 5 is a cross-sectional view of a third buoyant apparatus in accordance with an exemplary embodiment of the invention.
Figure 6:
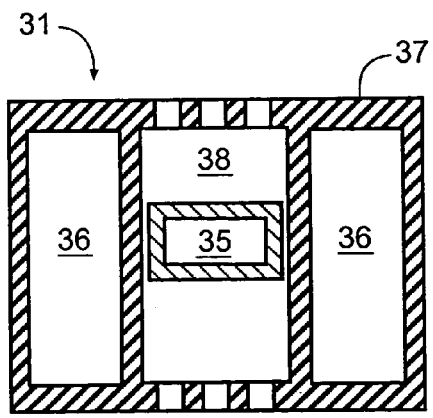
FIG. 6 is a cross-sectional view of a fourth buoyant apparatus in accordance with an exemplary embodiment of the invention.

In many instances the buoyant apparatus will include one or more storage cavities for holding electrical apparatus powered (directly or indirectly) by the coils of the buoyant apparatus. The size, shape, and positions of such cavities will likely vary between embodiments. In FIGS. 1 and 5, the storage cavities (26 in FIG. 5) are within the center housings 5 and 25. In FIG. 4, the storage cavity is in base 19. In FIG. 6, an apparatus 31 comprises a flotation collar 37 having a central cavity 38, and storage cavity 36, with a permanent magnet apparatus 35 floating within cavity 38.

Figure 7:
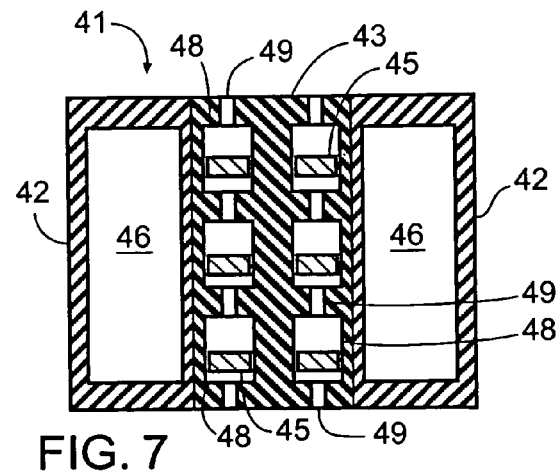
FIG. 7 is a cross-sectional view of a fifth buoyant apparatus in accordance with an exemplary embodiment of the invention.
Figure 8:
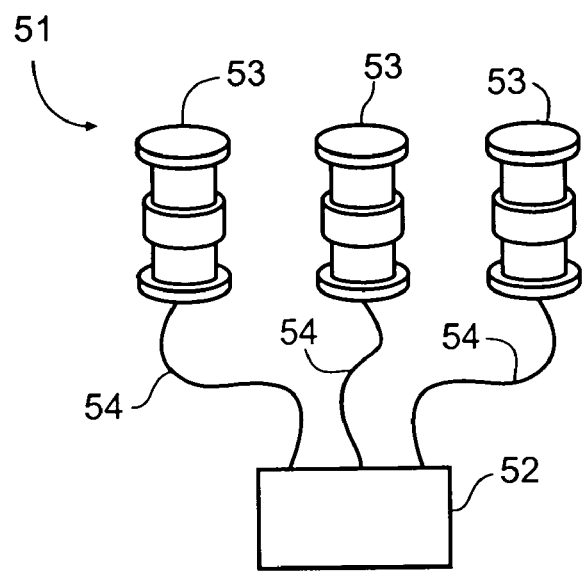
FIG. 8 is a schematic view of a sixth buoyant apparatus in accordance with an exemplary embodiment of the invention.

In some instances, an apparatus may have one or more power generation units that are separable from a storage unit. In FIG. 7, an apparatus 41, comprise a storage unit 42 coupled to a power generation unit 43. Unit 43 includes a plurality of cavities 48 within which magnet members 45 move. Unit 43 can be viewed somewhat as a combination of a plurality of apparatus 27 of FIG. 5 coupled to together serially and an in parallel to form adjacent stacks with aligned end openings 49. As used herein, serially indicates that fluid motion either upwards or downwards affects members sequentially in time, while parallel indicates that such movement affects members substantially simultaneously. Another example is shown in FIG. 8 in which apparatus 51 comprises a storage unit 52 powered by power generation units 53 via conductive cables 54. In addition to obtaining power from power generation units 53, storage unit 52 hangs from and thus is supported by the power generation units 53.

It is contemplated that relative motion between buoyant members may, in some instances, involve movement in a variety of directions, and may involve both translations and rotations of the buoyant members relative to each other. However, in preferred embodiments an apparatus will be constructed so as to float with one side generally positioned above an opposite and thus to function as the top of the apparatus with the opposite side being the bottom of the apparatus. Moreover, in preferred embodiments movement resulting in power generation will typically be linear movement along a line extending between the top and bottom of the apparatus. If the apparatus is sufficiently symmetrical to be characterized as having a center axis extending between a top and bottom of the apparatus, movement is preferably along the center axis or one or more lines parallel to the center axis. As used herein, movement along a line or axis includes of a member positioned on the line or axis and movement of a member in parallel to the line or axis.

It is contemplated that power generating buoyant apparatus as described herein may have a variety of shapes, sizes, and structures. As such, some may be generally cylindrical while others have other shapes, or have no defined shape as elements are freely moveable relative to each other. Also, some embodiments may comprise a variety of materials and/or combination of materials.

The power generating buoyant apparatus described herein may be advantageously used wherever fluid motion provides a source of energy, but is particularly advantageous when the fluid is an ocean or other large body of water with significant surface motion. Such apparatus may also be used for a variety of applications. One such application is powering sonobuoys.

Figure 9:
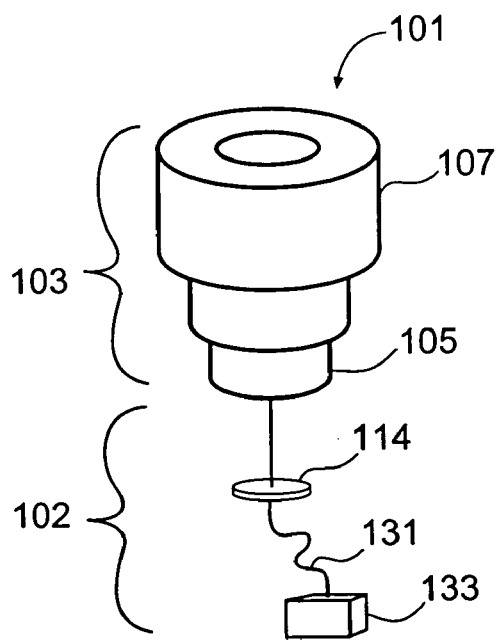
FIG. 9 is a sonobuoy in accordance with an exemplary embodiment of the invention.
Figure 10:
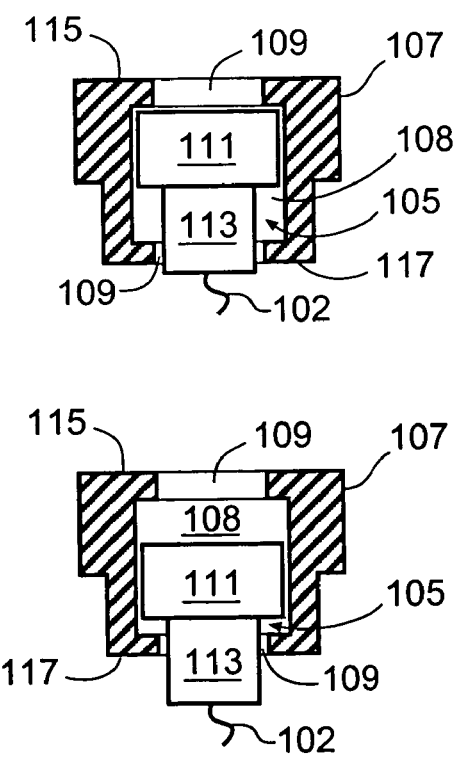
FIG. 10 is a schematic view of the sonobuoy of FIG. 9.

In FIG. 9, a sonobuoy 101 is a buoyant apparatus designed to utilize ocean wave power to generate adequate electricity to be self sufficient for extended time periods. The sonobuoy 101 includes a housing assembly 103, a center housing 105, a free moving urethane foam flotation collar 107, and a sensor array assembly 102. The center electronics housing 105 includes upper electronics unit (UEU) 111 and a lower electronics unit (LEU) 113, as shown in FIG. 10. An inside vertical wall of the center housing 105 is fabricated from a polymer material with a coil of wire wound around its circumference. The flotation collar 107 is fabricated with internal permanent magnets. When the flotation collar 107 moves up and down outside the center housing 105, the induced magnetic force from the magnets moving through the coil will generate low frequency AC power. A power supply circuit inside the housing assembly 103 converts the generated low frequency AC power into DC power to charge a battery that is also within housing assembly 103. Excess heat generated will be dissipated by conductive cooling through a thermally conductive plate or other member in contact with ocean water.

The center housing 105 and the attached sensor array assembly 102 are together weighted to produce a slightly positive buoyancy. The housing 105 will slowly rise within cavity 108 in response to water flowing through lower end openings 109 of collar 107 until stopped by the reduced diameter flange 115 at the top of the collar 107 as shown in FIG. 10. As waves and swells hit the sonobuoy 101, the lightweight flotation collar 107 will rise significantly faster than the combination of center housing 105 and sensor array assembly 102 due to the flotation collar 107 having a significantly higher positive buoyancy and much lower mass relative to the combination of housing 105 and array assembly 102. The higher inherent mass and momentum of the center housing (which includes the UEU and LEU) 105, coupled with the drag coefficient of the 100-meter cable/sensor array and damper plate (sea anchor) 114 of array assembly 102, will cause it to rise significantly slower than the collar 107. The relative buoyancy, momentum, and drag of the 2 floating bodies (flotation collar 107 and the center housing 105 with attached cable/sensor array and sea anchor 114) are designed to ensure the center housing rises back to its upward most position in time for the next wave or swell, thereby ensuring continuous relative motion and power generation. The center housing 105 is limited in its downward travel by a second reduced diameter flange 117 at the bottom of the collar 107 as shown in FIG. 10.

Both the lower collar flange stop 117 and the buoyant center of the center housing 105 are extended below the water line. It is contemplated that extending them below the water line provides for maximized travel distance for the induced and magnetic field, and ensures that the buoyancy of the housing assembly 25 (with attached cable/sensor assembly 29), irrespective of its position relative to the flotation collar, will cause it to consistently and reliably rise to the upper collar stop.

It should be noted that the LEU 113 of the center housing 105 extends through the lower end opening 109 regardless of the position of the center housing 105 within the cavity 108. It is contemplated that having it do so provides numerous advantages with one of those being that it prevents the sensor array assembly 102 from being pulled into the cavity 108 and possibly interfering with the relative movement between the center housing 105 and the flotation collar 107. In addition, it ensures there is a sufficient buoyancy force, positioned low enough relative to the floatation collar 107, but dampened by the momentum and drag of the center housing 105 and cable/sensor array and damper plate (sea anchor) 114, to ensure the center housing 105 consistently and reliably rises back to its upward most position. This upper nominal position for the center housing 105 is necessary so that the relatively large buoyancy forces on the floatation collar at the next wave or swell will quickly move it upward relative to the center housing, thereby generating electrical power.

FIG. 11 provides a schematic of a possible arrangement of one or more magnets 141, one or more coils 143, a controller 145, a battery 147, and a load 149. In sonobuoy 101, the coils 143, power controller 145, and electrical storage unit 147 and at least a portion of the load 149 are part of the UEU. Additionally, as shown in FIG. 12, the UEU 111 may contain an acoustic hydrophone and preamp 151, a laser opto-electronics assembly 152 for fiber optics sensors, a hydrophone sensor array 153, a radio frequency (RF) floating antenna 154, and/or alternative power sources 155. It may also include modulation and demodulation circuitry 156, an input/output (I/O) interface to the sensor heads 157, an RF transmitter 158, a PC based processor with a hard disk drive 159, and battery charging circuits 160.

The LEU 113 provides an interface to sensor array assembly 102, and provides acoustic, electrical, or optical signals to UEU 111, possibly through wire or fiber optic cables and a compliant suspension system. The sensor array assembly 102 is coupled to the center housing 105, and includes a sensor array 133, a damper/anchor plate 114, and a cable 131 that is initially in a coiled configuration in a cable pack. When the sonobuoy 101 is deployed, the cable 131 uncoils from the cable pack until the sensor array 133 is deployed below center housing 105, at which point the cable serves to maintain the sensor array in a vertical position throughout the life of the sonobuoy 101.

It contemplated that the power generation system described herein may in some instances also act as shock absorber, or dampener, to minimize the tugging on the sensor/tether line due to wave action.

A contemplated instance of an embodiment of the present invention includes a 24 inch diameter by 10.4 inch high flotation collar 107, and a 14-inch high center/electronics housing 105. The housing 105 is 16 inches in diameter at the top section where the windings are located, and reduced to 14 inches in diameter at the bottom. The approximate weight of this assembly will be 25 pounds. The estimated net weight of a sensor array assembly 102 including a 100-meter cable will be 5 pounds. The combined housing 105 and the sensor assembly 102 will be balanced to ensure reliable operation in all conditions of wind, waves, swells, and currents.

The buoyancy force (BF) on the 24-inch diameter×10.4-inch (0.866 feet) high flotation collar is calculated, using the estimated total weight of 20 pounds, an outer diameter=2 ft (R=1 ft), and an inner diameter d=16 inches (r=8/12 ft):

$BF = \pi(R^2 - r^2) \times 0.87$ ft $\times 62.5$ lbs/ft$^3$ $- 20$ lb collar weight=74 lb (buoyancy force, fully submerged)

This buoyancy force moves the collar 107 with the magnets upward and past the wire windings and the calculated force is adequate to overcome the inductive reactance between the magnets and the coil of wire. Generated power can now be estimated from moving this 74 lb force thru the distance of 7 inches, assuming an average efficiency of 80% since the mechanical work is converted directly into AC current. Only small waves or swells of 7 inches are required to generate this mechanical work. For the power estimate, an average of 6 of these waves or swells per minute is assumed. The 20 lb mass will be more than adequate to overcome the inductive reactance of the coil when the collar 107 is in the down cycle toward its nominal position.

Work=80%×6 swells×1 ft×74 lbs=355 ft-lb

Power is 355 ft-lb/min×0.0226 W/(ft-lb/min)=8 W

Therefore, this instance of a power generator will provide 8 W of average power to charge internal batteries. The power supply will convert variable amplitude and variable frequency AC voltage to DC. The AC voltage will be rectified then charge a capacitor to the peak voltage levels, then feed a DC/DC converter. The output will be used to charge the battery. The DC/DC converter will be designed to operate from a wide input voltage range to accommodate the expected wide amplitude range of the generator output.

To confirm that the enclosure assembly consistently returns to its nominal position, the "buoyancy vs. submerged depth" has been calculated as shown in the table of FIG. 13.

What is claimed is:

1. A buoyant apparatus for generating power by movement of a first part of an electromagnetic generator past a second part of an electromagnetic generator, the buoyant apparatus adapted to float in a body of water, the buoyant apparatus comprising:
   a first buoyant member containing electrical circuitry and the first part of the electromagnetic generator, the first buoyant member having a predetermined mass;
   a second buoyant member containing the second part of the electromagnetic generator, the second buoyant member connected to the first buoyant member for linear movement with respect to the first buoyant member, the mass of the second buoyant member being substantially less than the mass of the first buoyant member; and
   a structure having a predetermined mass suspended in the water below the water line, the structure being tethered to the first buoyant member, the combined mass of the first and second buoyant members, and the tethered structure maintaining the buoyant center of the first buoyant member and one end of the second buoyant member, below the water line.

2. The apparatus of claim 1 wherein the first buoyant member is elongated, and the second buoyant member moves along the length of the first buoyant member.

3. The apparatus of claim 2 wherein the second buoyant member at least partially surrounds a portion of the first buoyant member.

4. The apparatus of claim 3 wherein the second buoyant member completely encircles a portion of the first buoyant member.

5. The apparatus of claim 2 wherein the first part of an electromagnetic generator is at least one conductive coil and the second part of an electromagnetic generator is at least one permanent magnet.

6. The apparatus of claim 5 wherein the structure tethered to the first buoyant member is a sensor array.

7. The apparatus of claim 5 wherein the electrical circuitry is electrically coupled with the first part of the electromagnetic generator such that current flowing through the electromagnetic generator is used to power the electrical circuitry.

8. A sonobuoy for use in a body of water comprising:
   a buoyant center housing having a vertical wall circumference fabricated from a polymer material with wire wound around the circumference;
   a battery and a power supply apparatus located in the center housing;
   a buoyant free moving urethane foam flotation collar surrounding the vertical wall circumference of the center housing, the urethane foam collar containing permanent magnets; and
   a sensor array coupled to the buoyant center housing, the combined mass of the center housing, the urethane foam collar and the sensor array adapted for maintaining the buoyant center of the center housing and one end of the flotation collar below the water line;
   whereby movement of the flotation collar up and down the vertical wall of the center housing generates a low frequency AC current in the coil and the power supply converts the AC current into a DC current to charge the battery.

9. The sonobuoy of claim 8 further comprising a metal plate having a surface that is part of the exterior surface of the sonobuoy and is positioned to be at least partially submerged during operation of the sonobuoy wherein the metal plate is thermally coupled to at least one of the coil, power supply circuit, and battery such that excess heat generated will be dissipated to the water the sonobuoy is deployed in by conductive cooling through the metal plate.

10. The buoyant apparatus of claim 1 wherein the first buoyant member is contained within a first hollow cavity in the second buoyant member.

11. The buoyant apparatus of claim 10 wherein the second buoyant member has a top flange partially covering the first hollow cavity and a bottom flange partially covering the first hollow cavity, the top flange and the bottom flange preventing the first buoyant member from escaping from the second buoyant member.

12. The buoyant apparatus of claim 11 wherein the first buoyant member contains an upper electronics unit connected to a lower electronics unit.

13. The buoyant apparatus of claim 12 wherein the lower electronics unit extends beyond the second buoyant member at all times.

14. The buoyant apparatus of claim 13 wherein the structure below the water line is attached to the lower electronics unit.

15. The buoyant apparatus of claim 14 wherein the structure below the water line includes a sensor array.

16. The buoyant apparatus of claim 14 wherein the structure below the water line includes a damper plate connected to a sensor array.

17. The buoyant apparatus of claim 11 wherein there is a second hollow cavity within the second buoyant member.

* * * * *